United States Patent
Kurozuka et al.

(10) Patent No.: US 9,291,816 B2
(45) Date of Patent: Mar. 22, 2016

(54) SCANNING MIRROR AND SCANNING IMAGE DISPLAY DEVICE

(71) Applicant: PANASONIC CORPORATION, Osaka (JP)

(72) Inventors: Akira Kurozuka, Osaka (JP); Yuta Yamamoto, Osaka (JP); Shinsuke Nakazono, Osaka (JP); Kazuki Komaki, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 5 days.

(21) Appl. No.: 14/371,723

(22) PCT Filed: Mar. 14, 2013

(86) PCT No.: PCT/JP2013/001687
§ 371 (c)(1),
(2) Date: Jul. 10, 2014

(87) PCT Pub. No.: WO2013/140757
PCT Pub. Date: Sep. 26, 2013

(65) Prior Publication Data
US 2014/0375898 A1 Dec. 25, 2014

(30) Foreign Application Priority Data
Mar. 23, 2012 (JP) ................................ 2012-066604

(51) Int. Cl.
*G02B 26/10* (2006.01)
*G02B 26/08* (2006.01)
(Continued)

(52) U.S. Cl.
CPC ............ *G02B 26/105* (2013.01); *G02B 26/085* (2013.01); *G02B 26/0833* (2013.01);
(Continued)

(58) Field of Classification Search
CPC .................................................. G02B 26/0833
See application file for complete search history.

(56) References Cited

U.S. PATENT DOCUMENTS 5,497,231 A * 3/1996 Schmidt .................... G01J 3/06
356/328
5,614,705 A * 3/1997 Nagano .............. G06K 7/10584
235/462.36
(Continued)

FOREIGN PATENT DOCUMENTS

JP  2006-072319 A   3/2006
JP  4088188 B2   5/2008
(Continued)

OTHER PUBLICATIONS

International Search Report issued in International Application No. PCT/JP2013/001687 with mailing date of Apr. 9, 2013, with English Translation.

*Primary Examiner* — Paulos M Natnael
(74) *Attorney, Agent, or Firm* — McDermott, Will & Emery LLP

(57) ABSTRACT

A scanning mirror includes a mirror unit configured to reflect a laser beam, a supporter configured to cause the mirror unit to rotate and oscillate, and an oscillation sensor configured to output a monitor signal indicating oscillation of the mirror unit. A photodetector detects an intensity of the laser beam. When a value of the monitor signal falls out of a predetermined range of a normal operation and a value of the intensity detected by the photodetector fails to decrease, a breaking signal for causing the supporter to oscillate more than a breaking limit angle of the supporter is input. This scanning mirror and an image projection device using this scanning mirror can display an image at sufficient brightness safely.

14 Claims, 10 Drawing Sheets

(51) Int. Cl.
 *H04N 9/31* (2006.01)
 *G09G 3/02* (2006.01)
 *G09G 3/00* (2006.01)

(52) U.S. Cl.
 CPC ............ *G02B26/101* (2013.01); *H04N 9/3135* (2013.01); *H04N 9/3155* (2013.01); *H04N 9/3161* (2013.01); *G09G 3/002* (2013.01); *G09G 3/025* (2013.01)

(56) References Cited

U.S. PATENT DOCUMENTS

| | | | | |
|---|---|---|---|---|
| 7,379,220 B2 * | 5/2008 | Hama | ................ | H04N 1/00795 359/201.1 |
| 7,924,486 B2 * | 4/2011 | Yen | ...................... | G02B 26/105 359/199.1 |
| 8,143,561 B2 * | 3/2012 | Yen | ...................... | G02B 26/105 250/201.1 |
| 8,797,550 B2 * | 8/2014 | Hays | ........................ | G01J 9/04 356/519 |
| 2005/0007562 A1 | 1/2005 | Seki et al. | | |
| 2006/0028622 A1 | 2/2006 | Nojima et al. | | |
| 2007/0041068 A1 * | 2/2007 | Heminger | .......... | G02B 26/0841 359/199.1 |
| 2008/0137363 A1 * | 6/2008 | Harris | ................ | A61B 1/00096 362/574 |
| 2010/0059696 A1 * | 3/2010 | Heintzmann | ...... | G02B 21/0056 250/550 |
| 2013/0050791 A1 | 2/2013 | Nakazono et al. | | |

FOREIGN PATENT DOCUMENTS

| | | |
|---|---|---|
| JP | 2009-237239 A | 10/2009 |
| JP | 4403716 B2 | 1/2010 |
| JP | 2010-107545 A | 5/2010 |
| WO | 2011/121945 A1 | 10/2011 |

* cited by examiner

SCANNING MIRROR AND SCANNING IMAGE DISPLAY DEVICE

RELATED APPLICATIONS

This application is a national phase of International Application No. PCT/JP2013/001687, filed on Mar. 14, 2013, which in turn claims the benefit of Japanese Application No. 2012-066604, filed on Mar. 23, 2012, the disclosures of which Applications are incorporated by reference herein.

TECHNICAL FIELD

The present invention relates to a scanning mirror capable of displaying an image by scanning with a laser beam, and to a scanning image display device.

BACKGROUND ART

A laser beam may be emitted while it is focused into collimated light. Therefore, the laser beam can perform scanning two-dimensionally to display an image using a mirror element. This type of a scanning-type laser projector is power saving, as this projector displays an image by modulating an intensity of the laser beam, when compared to a common projector that always illuminates an entire two-dimensional image display device, such as a liquid crystal panel or a digital micromirror device (DMD). In addition, the device may have a small size as the device does not require an illumination optical system that evenly illuminates the two-dimensional image device. In particular, the small device may employ a MEMS mirror element capable of performing oscillation control of a mirror having a diameter of about 1 mm at a frequency of several ten kilohertz.

Thus, the scanning-type laser projector can be mounted onto a small mobile device so as to allow enjoyment of a large-screen display even with a mobile phone on which it is difficult to mount a large display.

On the other hand, safety standards determine permissive radiation power for laser application products, such as laser projectors, and a technique for making the display bright by increasing radiation power while ensuring safety is demanded. In particular, with the scanning image display device, it is predicated that scanning of the laser beam does not stop, as an intensity of a laser beam that enters human eyes as pulsed light by scanning is calculated, and the permissible exposure level is calculated based on a safety level of the intensity.

Therefore, it is necessary to reduce a possibility that a laser beam of a danger level is radiated outside the device as much as possible, considering various failure modes. In general, a sensor monitors an operation of a scanning mirror, and the laser is turned on after it is confirmed that scanning is normally performed. When amplitude of the scan is below amplitude within a range of the emitted laser beam or stops, an output of the laser is suppressed or the laser is stopped. However, it is desired to address the above problem, as the laser control system may go out of order or in failure from some reasons.

For example, in a conventional scanning image display device described in PTL 1, a scanning mirror is previously pulled by a spring. By driving the scanning mirror with a force over a force of the spring, the mirror moves to a position at which the laser beam is not irradiated when driving of the mirror stops.

Further, in a conventional scanning image display device described in PTL 2, generation of power supplied to a laser light source stops when an abnormality occurs in scanning.

Further, in a conventional scanning image display device described in PTL 3, when an output of a laser abnormally increases, an optical element converts its characteristic and optical transmittance or reflectance decreases.

Each of the patent literatures describe prevents of a laser beam that is not scanned from being emitted due to some causes of a failure, malfunction of laser control in a worst case. However, with the above conventional image display devices, it is difficult to prevent a laser beam that is not scanned from being emitted due to a combination of various reasons of a failure, malfunction of laser control in a worst case.

CITATION LIST

Patent Literature

PTL 1: Japanese Patent No. 4088188
PTL 2: Japanese Patent No. 4403716
PTL 3: Japanese Patent No. 4483703

SUMMARY

A scanning mirror includes a mirror unit configured to reflect a laser beam, a supporter configured to cause the mirror unit to rotate and oscillate, and an oscillation sensor configured to output a monitor signal indicating oscillation of the mirror unit. A photodetector detects an intensity of the laser beam. When a value of the monitor signal falls out of a predetermined range of a normal operation and a value of the intensity detected by the photodetector fails to decrease, a breaking signal for causing the supporter to oscillate more than a breaking limit angle of the supporter is input.

This scanning mirror and an image projection device using this scanning mirror can display an image at sufficient brightness safely.

DETAIL DESCRIPTION OF PREFERRED EMBODIMENT

Figure 1:
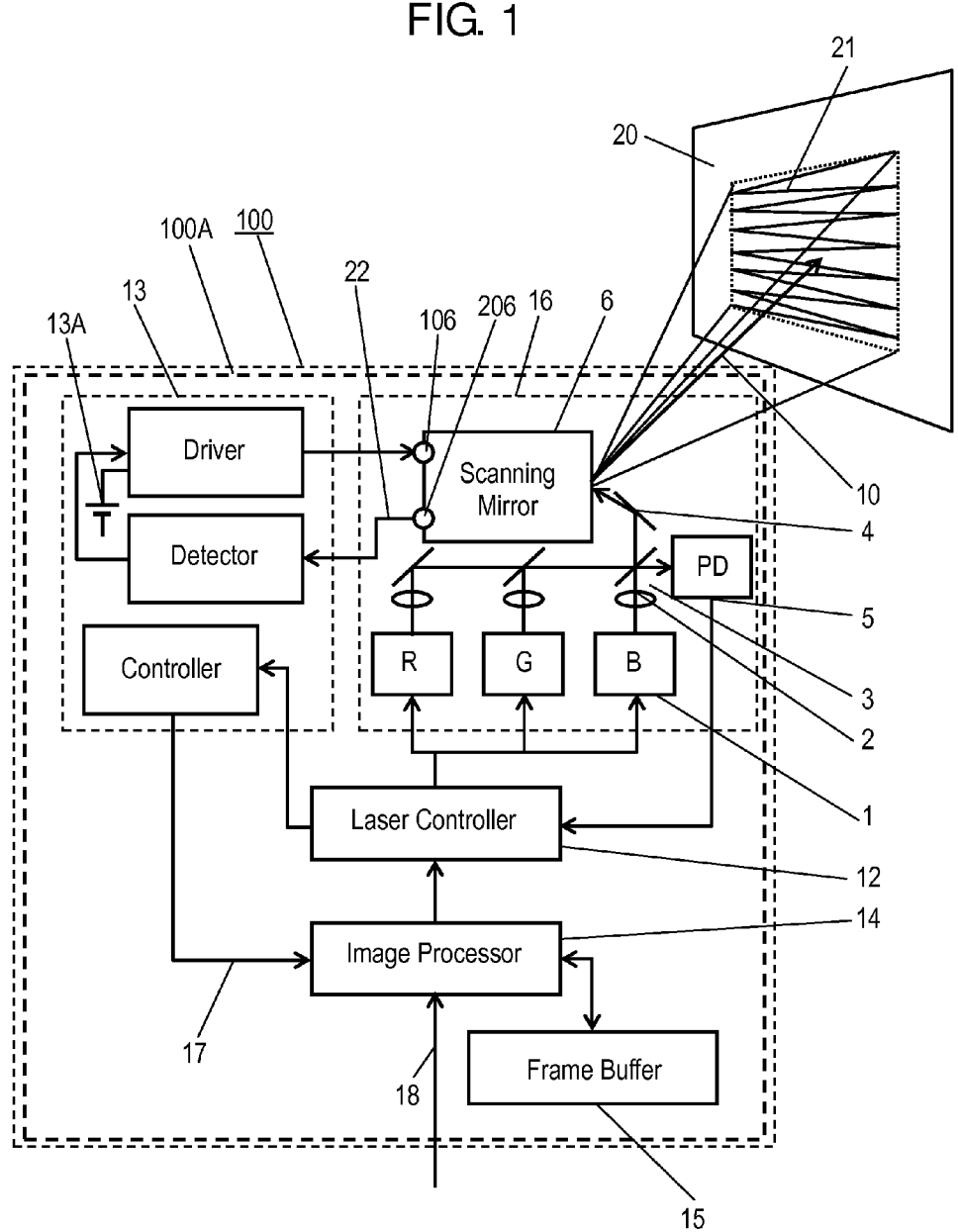
FIG. 1 is a block diagram of a scanning image display device according to an exemplary embodiment.

FIG. 1 is a block diagram of scanning image display device 100 according to an exemplary embodiment. Scanning image display device 100 includes light source 1 outputting laser beam 10, collimate lens 2, dichroic mirror 3, folding mirror 4, and scanning mirror 6 that reflects and projects laser beam 10. Light source 1 is a semiconductor laser element that outputs laser beams of three colors of red (R), green (G), and blue (B). Scanning image display device 100 further includes laser controller 12 that modulates laser beam 10, mirror driver 13 that drives scanning mirror 6, photodetector (PD) 5 that detects an intensity of a part of the laser beam emitted from light source 1, image processor 14, and housing 100A. The components such as scanning mirror 6 are fixed to housing 100A. Scanning mirror 6 includes actuator 106 connected to mirror driver 13 and oscillation sensor 206. Mirror driver 13 outputs a drive signal for causing scanning mirror 6 to rotate and oscillate to actuator 106. According to this embodiment, scanning mirror 6 rotates and oscillates about two axes along directions different from each other based on the drive signal. Oscillation sensor 206 outputs a monitor signal according to a state of oscillation of scanning mirror 6 to mirror driver 13.

An operation of scanning image display device 100 will be described below.

The laser beams of three primary colors output from light source 1 are focused by respective collimate lenses 2 and combined by dichroic mirrors 3 into a single laser beam 10. Laser beam 10 passes through folding mirror 4 and then enters to scanning mirror 6. Scanning mirror 6 rotates and oscillates about two axes, thereby scanning laser beam 10 two-dimensionally across screen 20.

Display image data 18 of an image to be displayed is externally input to image processor 14.

Image processor 14 stores input display image data 18 in frame buffer 15, reads the image data from frame buffer 15, and supplies the image data to laser controller 12 in synchronization with synchronization signal 17 output from mirror driver 13.

Laser controller 12 generates a modulation signal for modulating the laser beams in response to an image signal. Light source 1 outputs the laser beams having intensities modulated in response to the modulation signal.

Monitor signal 22 output from oscillation sensor 206 of scanning mirror 6 returns to mirror driver 13, and causes scanning mirror 6 to be feedback-controlled and to rotate at a constant frequency and constant amplitude.

Photodetector 5 individually detects intensities of the laser beams of three primary colors that have been output, and laser controller 12 controls, based on the detected intensities, balance between the intensities of the laser beams of three primary colors and total brightness of the laser beams of three primary colors.

Laser beam 10 scanned by scanning mirror 6 draws scanning trajectory 21 on screen 20.

Figure 2A:
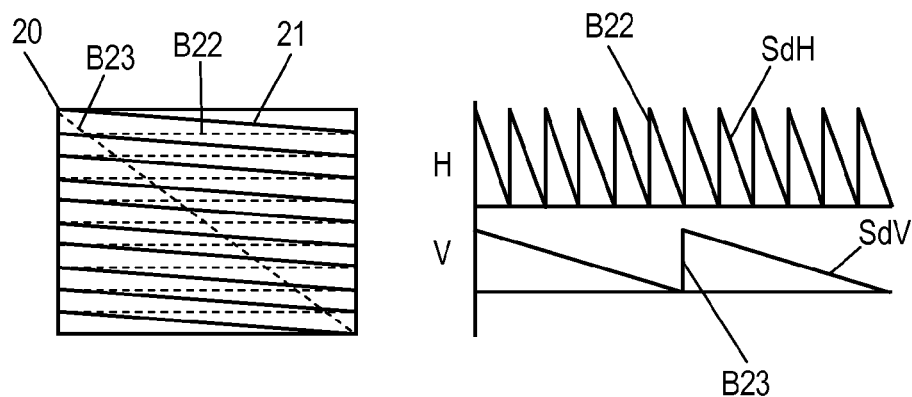
FIG. 2A shows a spot trajectory of a laser beam and a waveform of a drive signal of the scanning image display device according to the embodiment operating in a linear scanning method.
Figure 2B:
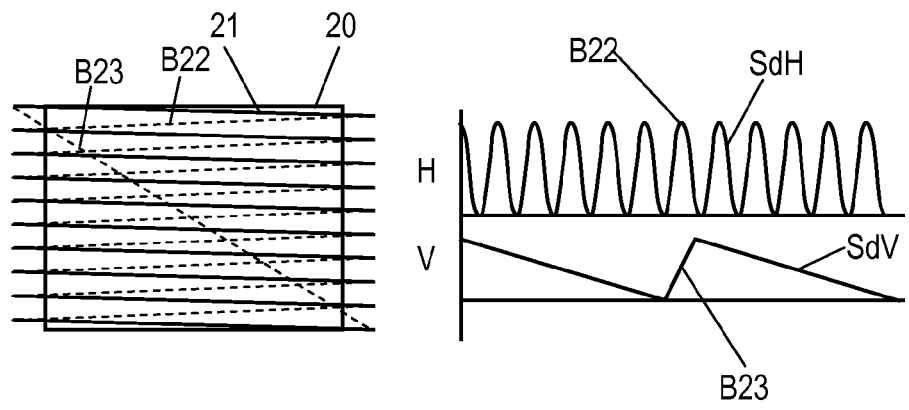
FIG. 2B shows a spot trajectory of a laser beam and a waveform of a drive signal of the scanning image display device according to the embodiment operating in a resonant scanning method.

A method of scanning the laser beam will be described below. FIGS. 2A and 2B show scanning trajectory 21 of laser beam 10 on screen 20 and waveforms of drive signal SdH in a horizontal (H) direction and drive signal SdV in a vertical (V) direction.

FIG. 2A shows scanning trajectory 21 produced by a linear raster scanning method in which both of drive signal SdH in the horizontal direction and drive signal SdV in the vertical direction are linear.

Horizontal blanking interval B22 refers to an interval in which scanning trajectory 21 returns to the left end from the right end of screen 20, and vertical blanking interval B23 refers to an interval in which scanning trajectory 21 returns to the top end from the bottom end of screen 20. In horizontal blanking interval B22 and vertical blanking interval B23, scanning mirror 6 returns while not emitting laser beam 10.

Since a drive frequency in the horizontal direction is high, it is normally difficult to drive linearly only by mechanically driving scanning mirror 6.

FIG. 2B shows scanning trajectory 21 produced by a resonant raster scanning method in which both of drive signal SdH in the horizontal direction and drive signal SdV in the vertical direction are linear. Laser beam 10 is scanned in the horizontal direction by a resonant operation of scanning mirror 6. In the resonant driving, large amplitude may be obtained with a smaller force than the case in which scanning mirror 6 is driven linearly. On the other hand, in the vertical direction, the mirror is driven based on drive signal SdV having a sawtooth waveform at a frequency of a frame rate (normally 60 Hz). By setting the resonance frequency to be higher than 60 Hz, the mirror is driven linearly within a frequency band not higher than 60 Hz.

Further, in the resonant driving, scanning mirror 6 oscillates according to a sine curve. One way scanning in the horizontal direction increases the horizontal blanking interval, and a duty which is a ratio of lighting time with respect to a total duration of reciprocation of horizontal scanning of laser beam 10 is 50%.

When scanning mirror 6 is oscillated by resonant oscillation, the image data read from frame buffer 15 is accumulated in a line buffer, and reciprocal scanning in right and left directions is performed for each line. In this operation, scanning mirror 6 can be driven at a drive frequency a higher-speed half of that in the common method of causing laser beam 10 to be scanned in the right direction. Further, it is possible to efficiently display an image since the lighting time of laser beam 10 is doubled.

Figure 3:
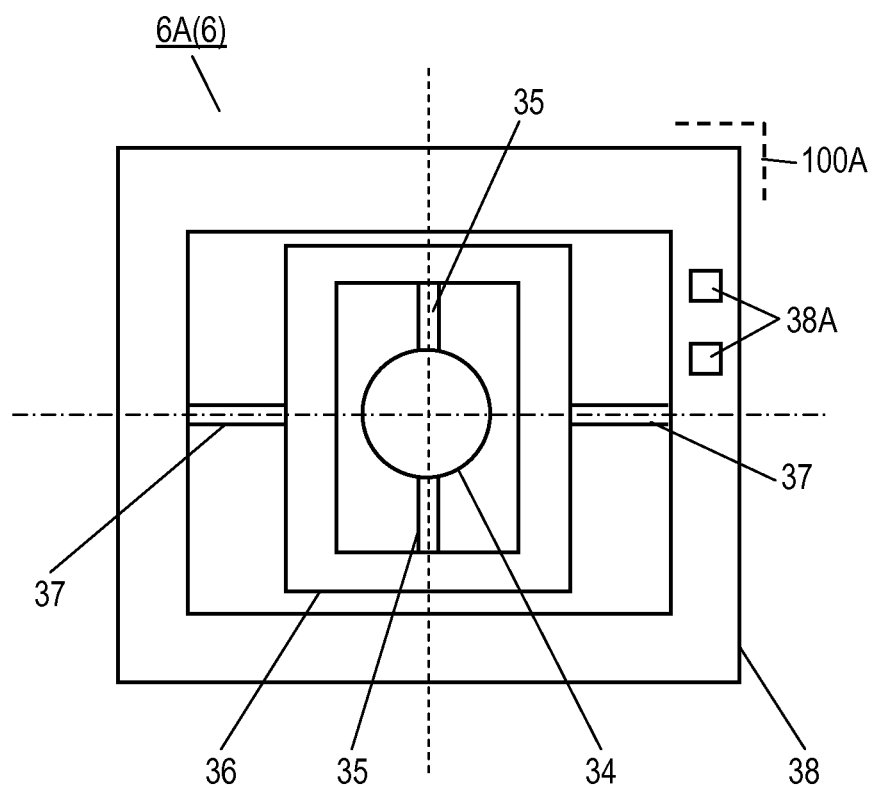
FIG. 3 is a top view of a scanning mirror of the scanning image display device according to the embodiment.

FIG. 3 is a top view of scanning mirror 6A according to the embodiment used as scanning mirror 6 illustrated in FIG. 1. Scanning mirror 6A shown in FIG. 3 is a MEMS scanning mirror having two axes integral with each other. Scanning mirror 6A includes mirror unit 34 that reflects laser beam 10, movable frame 36 surrounding mirror unit 34, two higher-speed supporters 35 that support mirror unit 34 to movable frame 36 so as to allow the mirror unit to perform rotating oscillation, outer frame 38 surrounding movable frame 36, two lower-speed supporters 37 that support movable frame 36 to outer frame 38 so as to allow the movable frame to perform rotating oscillation, and electrode pads 38A provided on outer frame 38. Outer frame 38 is a fixed frame that is fixed to housing 100A of scanning image display device 100. Higher-speed supporters 35 and lower-speed supporters 37 constitute a supporter that supports mirror unit 34 to the outer frame so as to allow mirror unit 34 to perform rotating oscillation. Higher-speed supporters 35 cause mirror unit 34 to perform rotating oscillation at a higher speed higher (frequency) than lower-speed supporters 37.

Scanning mirror 6A is driven, for example, by an electromagnetical driving method. Scanning mirror 6A further includes a coil, a magnet, and a yoke. The coil is provided at mirror unit 34 and movable frame 36. The magnet and yoke are disposed around the coil. The coil, the magnet, and the yoke form a magnetic circuit and constitute actuator 106, as shown in FIG. 1. In this magnetic circuit, a magnetic field is applied to the coil which has a current flowing therein to cause mirror unit 34 to perform rotating oscillation by torque based on Fleming's rule according to the current. Scanning mirror 6A further includes strain sensors provided at higher-speed supporters 35 and lower-speed supporters 37. The strain sensors each outputs a signal in response to strain due to twisting distortion of higher-speed supporters 35 and lower-speed supporters 37. Oscillation of mirror unit 34 may be detected by the signal detected by a detector circuit, such as a bridge circuit. Scanning mirror 6A may include optical reflectors disposed behind mirror unit 34 instead of the strain sensors. The oscillation of mirror unit 34 may be detected by I-V converting an output of the reflectors detected by the rotation of mirror unit 34. These strain sensors or the reflectors constitute oscillation sensor 206 shown in FIG. 1.

Figure 4:
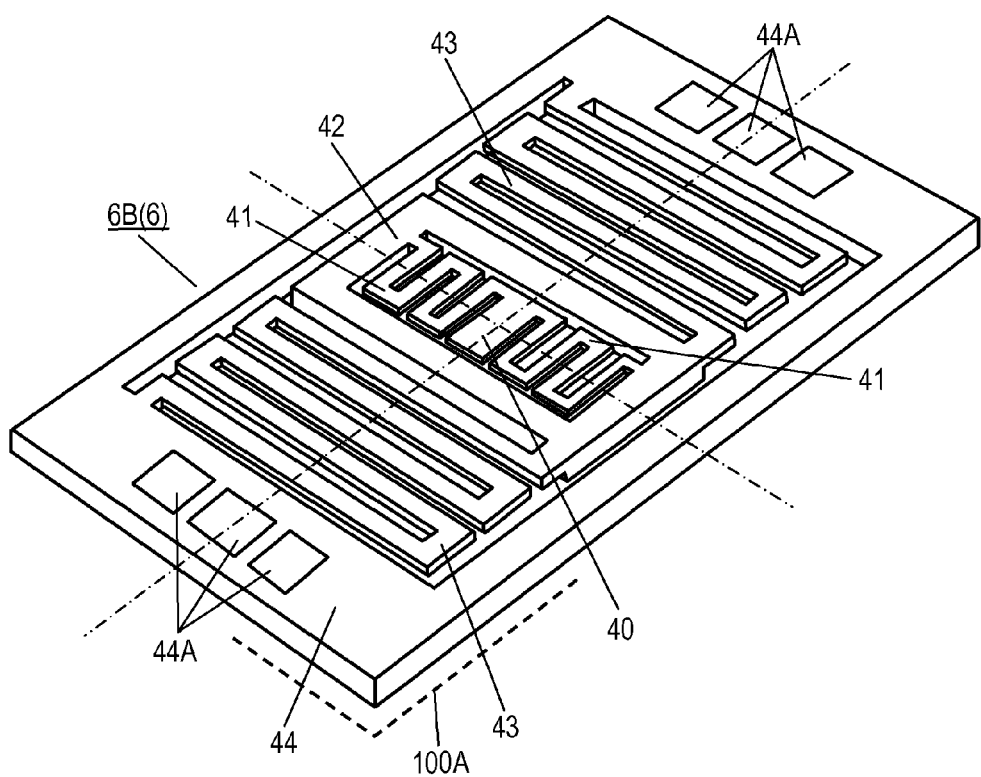
FIG. 4 is a perspective view of another scanning mirror of the scanning image display device according to the embodiment.

FIG. 4 is a perspective view of another scanning mirror 6B according to the embodiment used as scanning mirror 6 shown in FIG. 1. Scanning mirror 6B is a piezoelectric scanning mirror. Scanning mirror 6B includes mirror unit 40 that reflects laser beam 10, movable frame 42 surrounding mirror unit 40, two higher-speed supporters 41 that support mirror unit 40 to movable frame 42 so as to allow the mirror unit to perform rotating oscillation, outer frame 44 surrounding movable frame 42, two lower-speed supporters 43 that support movable frame 42 to outer frame 44 so as to allow the movable frame to perform rotating oscillation, and electrode pads 44A provided on outer frame 44. Outer frame 44 is a fixed frame that is fixed to housing 100A. Higher-speed supporters 41 and lower-speed supporters 43 constitute a supporter that supports mirror unit 40 to the outer frame so as to allow mirror unit 40 to perform rotating oscillation. Higher-speed supporters 41 cause mirror unit 40 to perform rotating oscillation at a higher speed (frequency) than lower-speed supporters 43.

Both of higher-speed supporters 41 and lower-speed supporters 43 are beams having a meandering shape. Scanning mirror 6B further includes drive electrodes and monitor electrodes provided on each of higher-speed supporters 41 and lower-speed supporters 43. Each of the drive electrodes and the detection electrodes includes a piezoelectric body. Upon a drive voltage applied to the drive electrodes, higher-speed supporters 41 and lower-speed supporters 43 warp in their thickness direction, and are driven so as to cause mirror unit 40 and movable frame 42 to rotate and oscillate. The monitor electrodes detect an amount of the warping of higher-speed supporters 41 and lower-speed supporters 43, and detect the rotating oscillation of mirror unit 40. Thus, the drive electrodes constitute actuator 106 shown in FIG. 1, and the monitor electrodes constitute oscillation sensor 206 shown in FIG. 1.

Piezoelectric scanning mirror 6B shown in FIG. 4 does not necessarily include a magnetic circuit, consequently being thinner than electromagnetically-driven scanning mirror 6A shown in FIG. 3. In either method, the higher-speed supporters at higher resonance frequency are located inside the lower-speed supporters at lower resonance frequency.

An oscillation properties and drive signals of scanning mirror 6 will be described below.

Figure 5:
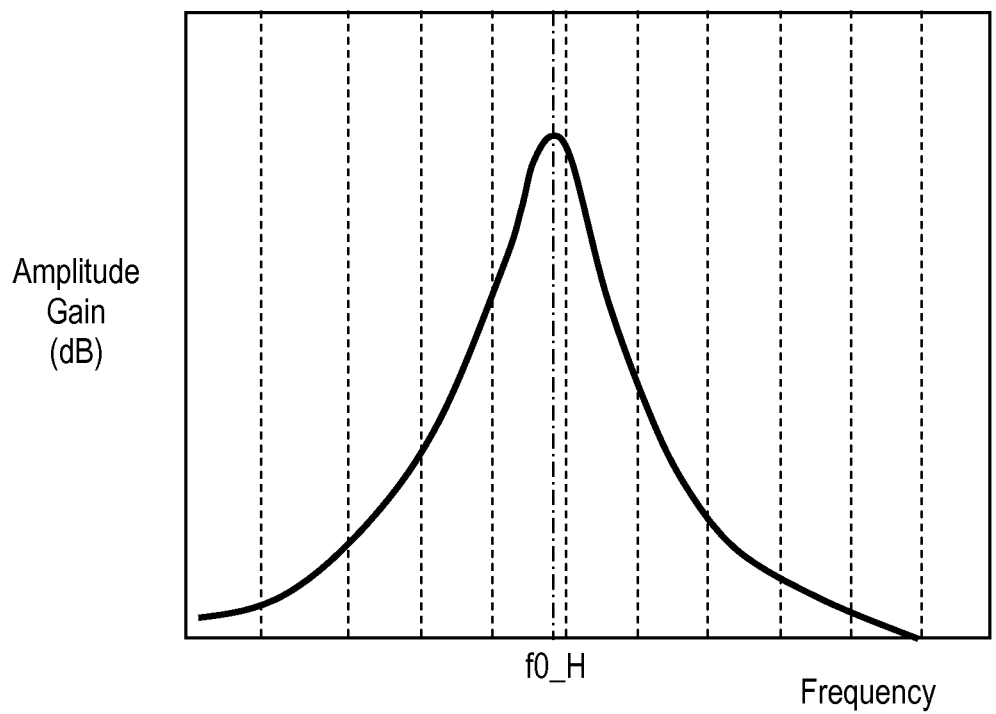
FIG. 5 shows an oscillation property of a higher-speed supporter of the scanning mirror of the scanning image display device according to the embodiment.

FIG. 5 shows the oscillation property of higher-speed supporters 35 (41) of scanning mirror 6A (6B). In FIG. 5, the horizontal axis represents a frequency, and the vertical axis represents an amplitude gain indicating amplitude of oscillation of higher-speed supporters 35 (41).

In order to cause mirror unit 34 (40) to perform rotating oscillation by higher-speed supporters 35 (41), higher-speed supporters 35 (41) performs resonant driving at resonance frequency f0_H that is determined by a rigidity of higher-speed supporters 35 (41) in a twisting direction and inertia moment of mirror unit 34 (40). The amplitude exhibits a large peak around the resonance frequency, and it is possible to obtain predetermined amplitude at a low voltage of several volts.

Figure 6:
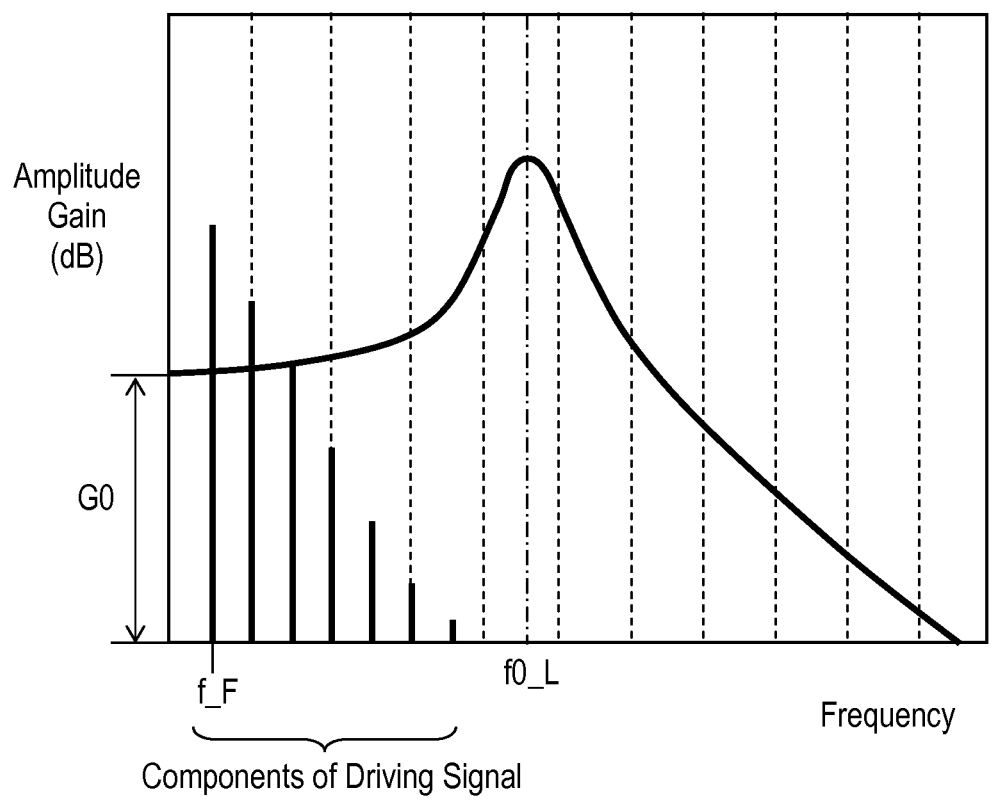
FIG. 6 shows an oscillation property of a lower-speed supporter of the scanning mirror of the scanning image display device according to the embodiment.

FIG. 6 shows the oscillation property of lower-speed supporters 37 (43) of scanning mirror 6A (6B) and a frequency component of the drive signal. In FIG. 6, the horizontal axis represents frequency, and the vertical axis represents an amplitude gain indicating an amplitude of oscillation of lower-speed supporters 37 (43) and a frequency component of the drive signal.

The drive signal applied to the drive electrode that causes lower-speed supporters 37 (43) to oscillate has a frequency lower than resonance frequency f0_L that is determined by inertia moment of mirror unit 34 (40), higher-speed supporters 35 (41), and movable frame 36 (42) and a rigidity of lower-speed supporters 37 (43) in a twisting direction. In other words, lower-speed supporters 37 (43) are configured to be driven in a non-resonant mode. Specifically, the drive signal has a sawtooth waveform including a component of a base frequency which is frame rate f_F and a component of a higher-order frequency which is integral multiple of the base frequency. According to the embodiment, frame rate f_F is, e.g. 60 Hz. In FIG. 6, resonance frequency f0_L is 510 Hz, and the drive signal has a sawtooth waveform containing a component of the base frequency at 60 Hz to a component of seventh-order harmonics at 420 Hz, which is seven times the base frequency.

While the amplitude of the oscillation of lower-speed supporters 37 (43) has a high resonance peak near resonance frequency f0_L, it is necessary to drive mirror units 34 and 40 at a component of a frequency lower than resonance frequency f0_L in order to drive mirror units 34 and 40 linearly with respect to time. In order to drive lower-speed supporters 37 (43) with low-frequency gain G0, lower-speed supporters 37 (43) are driven by a drive voltage that is several times or several tens of times higher than a drive voltage for driving higher-speed supporters 35 (41) by resonant driving.

An operation of scanning image display device 100 in compliance with safety standards of the laser beam will be described below. A maximum radiation power of the laser beam is determined such that energy entering a human eye when the laser beam scans the human eye is not larger than the safety level determined by safety standards.

One of the safety standards of the laser beam is "IEC60825-1 standards", and "JIS C6802 Radiation Safety Standards of Laser Products" (herein after referred to as JIS standards) in Japan, and specifies classification and a measuring method of laser products.

An accessible emission limit (hereinafter referred to as AEL) of class 1 that is basically safe is specified in Table 1 of the JIS standards by wavelengths and by exposure time. Products that emit visible light are specified to be in class 2 AEL in Table 2 of the JIS standards.

According to the tables, considering that a repulsive action, such as blinking, protects eyes from a laser beam in visible light and assuming that its reaction time is 0.25 seconds, the AEL is 1 mW when emission duration is not shorter than 0.25 seconds, and the AEL is determined to be the same as class 1 AEL when emission duration is shorter than 0.25 seconds.

Specifically, a radiation output of a laser beam in a continuous wave, such as a laser pointer, is limited to 1 mW.

By contrast, for scanning laser products, a standard for determining the AEL is specified in (f) repetitive pulsed laser and modulated laser, 8.4 rules for classification in the JIS standards. According to the rule, the AEL is determined using the most demanding one of the following three conditions:

1) Exposure from any single pulse in a pulse train may not exceed an AEL to a single pulse (AELsingle):

2) An average power of a pulse train in emission duration T may not exceed power corresponding to an AEL specified for a single pulse in emission duration T; and 3) An average pulse energy of pulses in a pulse train may not exceed a value determined by multiplying an AEL of a single pulse by correction factor C5 (AELtrain).

AELtrain=AELsingle×C5

$$C5 = N^{-0.25} \quad \text{(Formula 1)}$$

Here, N is a number of times of scanning a pupil in 0.25 seconds.

When scanning is performed two-dimensionally like scanning image display device 100, the condition 3) generally becomes most demanding as N becomes larger as the pupil is scanned with a laser beam. The measuring method is specified in 9.3 measurement optical system in the JIS standards.

Figure 7:
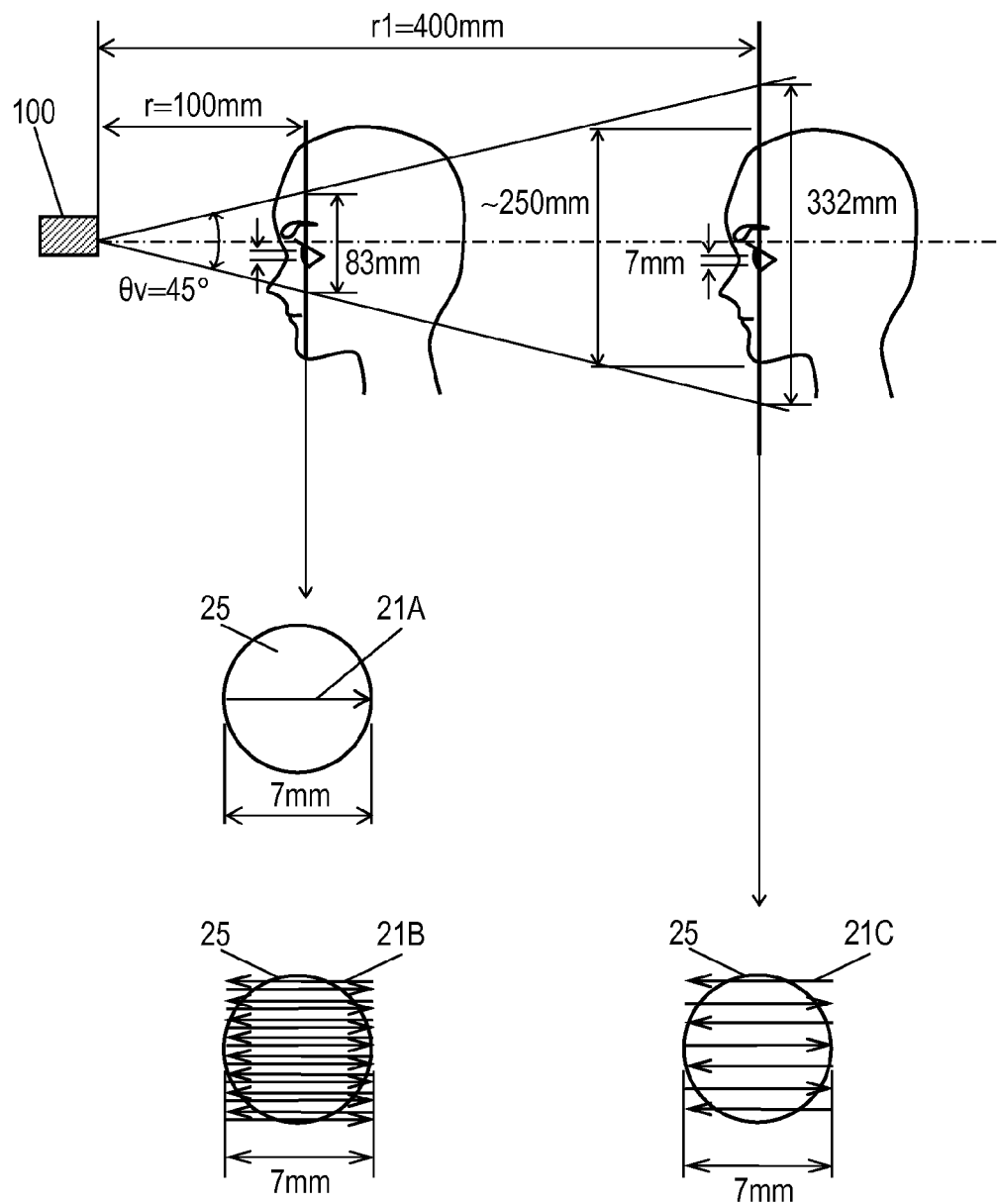
FIG. 7 is a schematic diagram of the scanning image display device according to the embodiment for illustrating a positional relation between the scanning image display device and a pupil.

A method of calculating the radiation power will be described below. FIG. 7 is a schematic diagram of scanning image display device 100 for showing a projecting region and a distance between the pupil and scanning image display device 100.

A measurement condition for radiation power of scanning laser beam is specified as that a diameter of measurement aperture 25 is 7 mm and a measurement distance r is 100 mm. The diameter of measurement aperture 25 of 7 mm is determined assuming that a maximum value of a diameter of a human pupil. FIG. 7 shows scanning trajectories 21A and 21B across measurement aperture 25 at distance r of 100 mm and scanning trajectory 21C across measurement aperture 25 at distance r1 of 400 mm. The radiation power calculated under the determined measurement condition changes depending on scanning conditions. Examples of calculation under the following scanning conditions will be described below. Suffixes "h" and "v" attached to parameters represent horizontal and vertical, respectively.

[Scanning Condition]
 Display Resolution: XGA: Nh=1024 (pixels), Nv=768 (pixels)
 Frame Rate: fv=60 Hz
 Field Angle θh=60°, θv=45°
 Over-Scanning Rate (Field Angle/Total Scan Angle): Kosh=Kosv=0.7
 Reciprocal Scanning in Horizontal Direction: Kub=2
 Horizontal scanning frequency fh is expressed as follows.

$$fh = fv \times Nv/Kosv/Kub = 32.9 \text{(kHz)} \quad \text{(Formula 2)}$$

Time t during which laser beam 10 crosses over a pupil of diameter D=7 mm at distance r=100 mm with scanning trajectory 21A is expressed as follows.

$$t = \text{Visual Angle of Measurement Aperture/Speed} \quad \text{(Formula 3)}$$
$$\text{of Horizontal Scan Angle}$$

$$= (D/r)/(2 \times fh \times \theta h/Kosh)$$
$$= 7.1 \times 10^{-7} (\text{sec})$$

The number of times N for scanning a pupil in 0.25 seconds is expressed as follows.

$$N = (D/r)/(\theta v/Nv) \times fv \times 0.25$$
$$= 1020 \text{ (times)}$$

The AELsingle, which is the AEL of a single pulse when $t=7.1 \times 10^{-7}$ (sec) is expressed as AELsingle=$2.0 \times 10^{-7}$ (J) based on Table 1 of the JIS. From Formula 1, average pulse energy AELtrain in a pulse train, which is the AEL of repetitive pulses, is expressed as follows.

$$AELtrain = AELsingle \times N^{-0.25} \quad \text{(Formula 4)}$$
$$= 2.0 \times 10^{-7} \times 1020^{-0.25}$$
$$= 3.54 \times 10^{-8} (J)$$

This value indicates AELtrain when measurement aperture 25 is in a state in which laser beam 10 leaves scanning trajectory 21B.

Radiation power Ptrain is expressed as follows.

$$Ptrain = AELtrain/t \quad \text{(Formula 5)}$$
$$= (3.54 \times 10^{-8})/(7.1 \times 10^{-7}) \times 1000$$
$$= 49.9 \text{ (mW)}$$

Based on the above result, a peak radiation power of laser beam 10 of scanning image display device 100 suppressed to 50 mW or lower allows an amount of radiant energy entering the pupil to be safe at the distance of about 100 mm, to be safe at the distance of 100 mm or longer as the laser beam spreads, and to be safe at the distance of 100 mm or shorter as the laser beam scanning over the pupil is not focused on one point on retina. In other words, the peak radiation power of laser beam 10 equal to or lower than 50 mW is considered to be safe under any condition.

When the peak radiation power is at 50 mW, brightness of scanning image display device 100 is about 10 lumens. In the above example, when a peak power of radiation light is determined to be 50 mW, time t during which the laser beam crosses over a pupil increases if field angle θh is smaller than the designed value, and the number of times N for scanning the pupil in 0.25 seconds increases if field angle θv is smaller. In either case, the radiation intensity exceeds the AEL as the intensity of the laser beam entering the pupil increases. When the peak power of the radiation light is reduced by half and is determined to be 25 mW, the radiation power exceeds the AEL when an area of the screen is reduced to half.

Thus, an operation of scanning mirror 6 in which an image is displayed on screen 20 with the intensity of the radiation light not exceeding the AEL and with higher-speed supporters 35 (41) and lower-speed supporters 37 (43) rotating and oscillating at field angles θh and θv is defined as a normal operation.

As described above, by evaluation of the radiant energy of the pulsed laser by scanning, an output 50 times larger than maximum radiation output 1 mW of continuous waves is permitted. If the field angle of the scanning mirror becomes narrower or the mirror stops for some reasons when laser is radiated at a maximum output power, the radiation intensity exceeds the AEL, and it is necessary to turn off the laser immediately. Therefore, the mirror driver acquires an oscillation condition of scanning mirror 6 based on monitor signals, monitors emission power, i.e., an intensity of the laser beam, using photodetector 5, so that the detected intensity may not be outside a safety level, that is, a predetermined range of the normal operation.

Laser controller 12 may have a problem and cannot turn off the laser, hence emitting laser of an intensity exceeding the AEL.

That is, when a level of the monitor signal decreases below a predetermined value and scanning mirror 6 is out of control even though the drive signal is output, it is not possible to shut down scanning image display device 100, and an output from photodetector 5 is detected even though a signal for stopping the laser is transmitted, it is determined to be a failure in a laser control system and the mirror driver starts to operate in a mirror breaking mode. Mirror driver 13 and laser controller 12 are preferably implemented by separate hardware.

Figure 8:
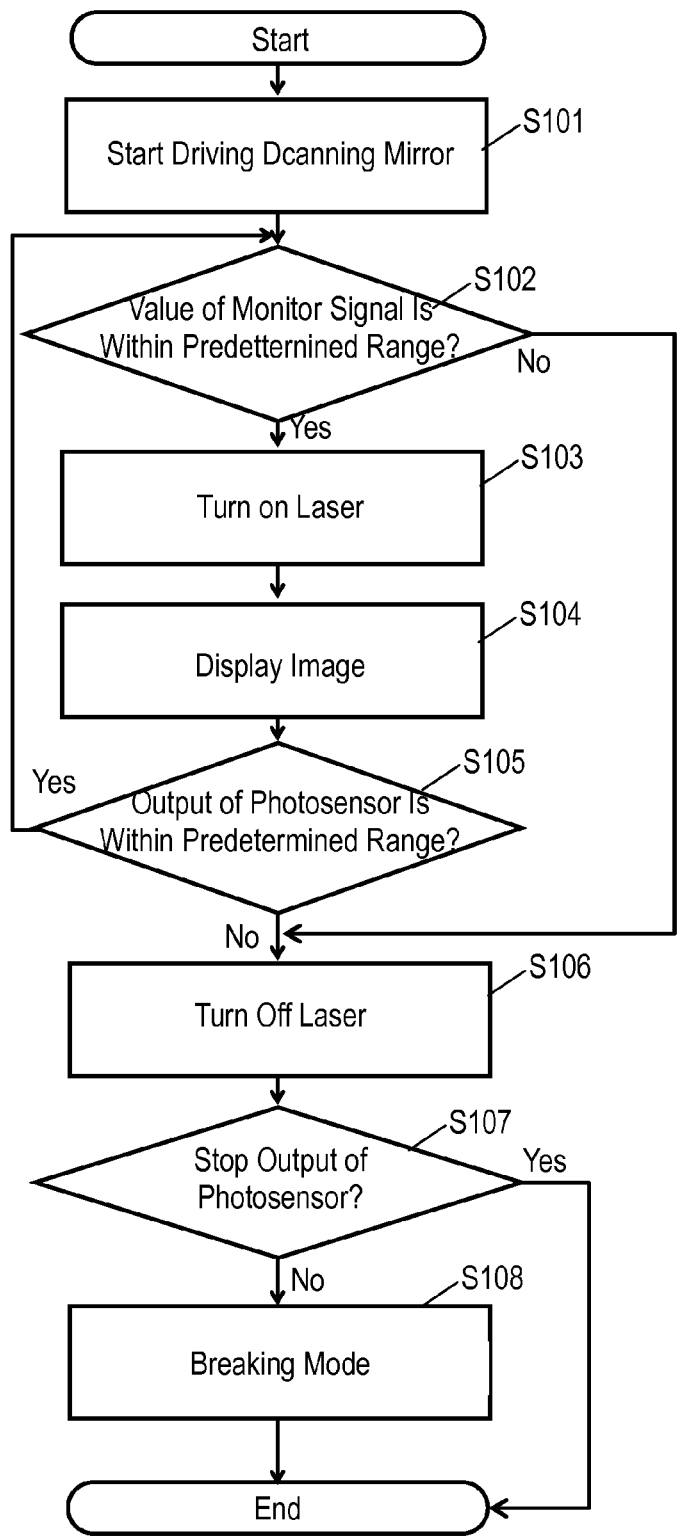
FIG. 8 is a flowchart of an operation of the scanning image display device according to the embodiment.

An operation in the mirror breaking mode will be described below. FIG. 8 is a flowchart of an operation of scanning image display device 100.

Upon starting up, scanning image display device 100 first applies a drive signal to scanning mirror 6 to start oscillation of scanning mirror 6 (Step S101). At this moment, laser controller 12 does not turn on laser. Then, laser controller 12 determines whether or not a value of the monitor signal corresponding to the oscillation of scanning mirror 6 is within a predetermined range (Step S102). If the value of the monitor signal is within the predetermined range at Step S102 ("Yes" at Step S102), the laser is turned on (Step S103), image data is read from frame buffer 15 based on an input image signal, an image is displayed on screen 20 by laser beam 10 modulated by a modulation signal according to the image data (Step S104). Laser controller 12 determines whether or not an intensity of the laser beam detected by photodetector 5 is within a predetermined range corresponding to the image data displayed (Step S105). If the intensity of the laser beam is within the predetermined range at Step S105 ("Yes" at Step S105), mirror driver 13 controls the drive voltage based on the monitor signal, and continues displaying the image while maintaining amplitude of the oscillation of scanning mirror 6 to be constant. While mirror driver 13 continues displaying the image while maintaining the amplitude of the oscillation of scanning mirror 6 to be constant, laser controller 12 repeats the operations at Steps S102 to S105.

If the value of the monitor signal is out of the predetermined range at Step S102 ("No" at Step S102), or if an output from photodetector 5 is out of the predetermined range at Step S105 ("No" at Step S105), laser controller 12 determines that there is an abnormality and turns off the laser (Step S106). Next, laser controller 12 determines whether or not photodetector 5 stops the output (Step S107). If photodetector 5 stops the output at Step S107 ("Yes" at Step S107), the operation of scanning image display device 100 is terminated. If photodetector 5 does not stop the output at Step S107 ("No" in Step S107), the laser controller determines that a failure occurs in the laser control system, and laser controller 12 causes mirror driver 13 to operate at the breaking mode for breaking scanning mirror 6 (Step S108). Thus, either supporter 35 or supporter 37 is broken when the value of monitor signal 22 falls outside the predetermined range of the normal operation and the value of the intensity of the laser beam detected by photodetector 5 does not decrease. Alternatively, either supporter 35 or supporter 37 is broken when the value of monitor signal 22 falls outside the predetermined range of the normal operation and the value of the intensity of the laser beam does not decrease.

Figure 9:
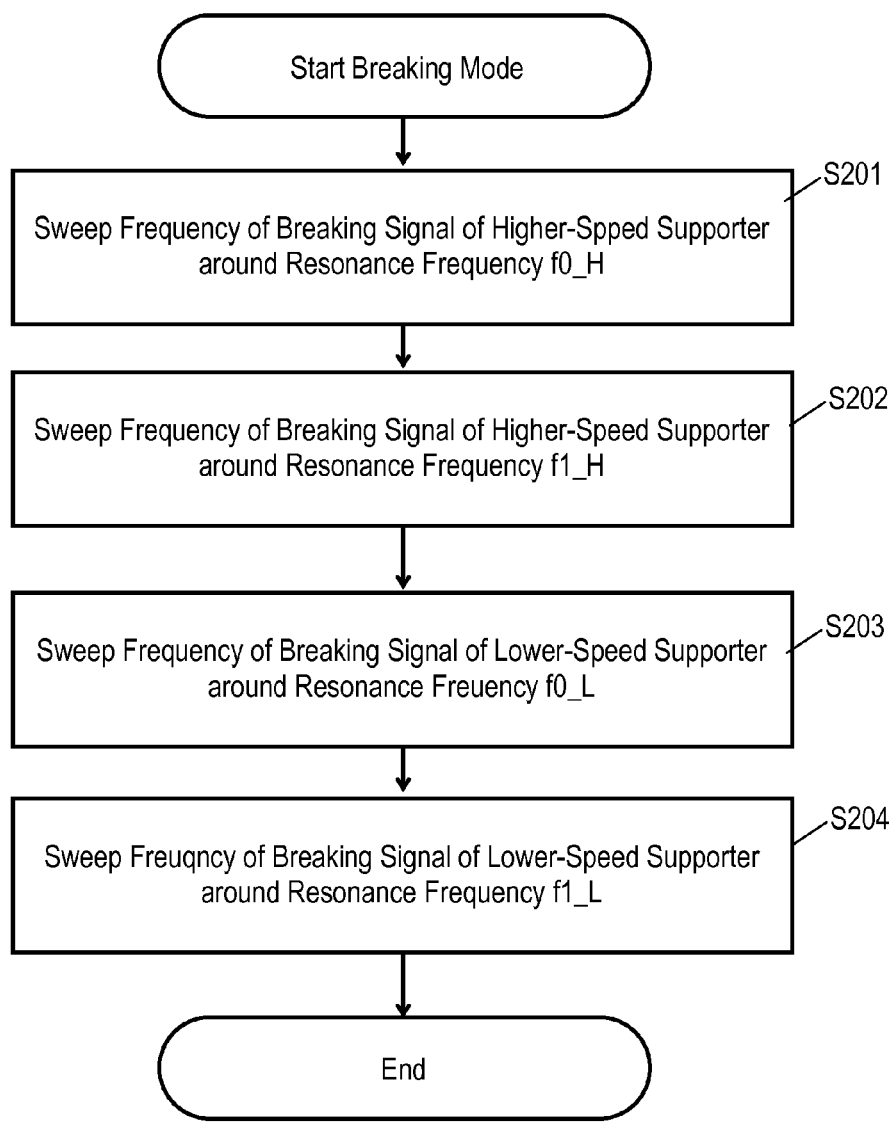
FIG. 9 is a flowchart of an operation in a breaking mode of the scanning image display device according to the embodiment.

FIG. 9 is a flowchart of an operation of scanning image display device 100 having scanning mirror 6A illustrated in FIG. 3 as scanning mirror 6 in the breaking mode.

Upon starting the breaking mode at Step S108, mirror driver 13 first causes higher-speed supporters 35 to oscillate with a breaking signal which is a drive signal at a frequency about resonance frequency $f0\_H$ in order to break higher-speed supporters 35 (Step S201). At Step S201, mirror driver 13 may cause higher-speed supporters 35 to oscillate while sweeping the frequency of the breaking signal from a frequency lower than resonance frequency $f0\_H$ to a frequency higher than resonance frequency $f0\_H$. A voltage of the drive signal is, for example, several volts at the normal operation in which an image is displayed at Step S104. By contrast, at Step S201, higher-speed supporters 35 oscillate with the drive signal at a voltage higher than the voltage in the normal operation. As described above, the drive voltage to drive lower-speed supporters 37 is several times or several tens of times higher than the drive voltage to drive higher-speed supporters 35 that perform resonant driving. Mirror driver 13 includes high-voltage power source 13A for generating the drive voltage for lower-speed supporters 37. At Step S201, mirror driver 13 uses power source 13A to generate the breaking signal which is a drive signal for causing higher-speed supporters 35 to oscillate. A voltage of the breaking signal is higher than the drive voltage in the normal operation. This operation causes higher-speed supporters 35 to break exceeding its breaking limit. Thus, mirror unit 34 is removed from higher-speed supporters 35 and does not emit a laser beam of an intensity exceeding the AEL to the outside even when the laser is not turned off, hence maintaining safety.

Figure 10:
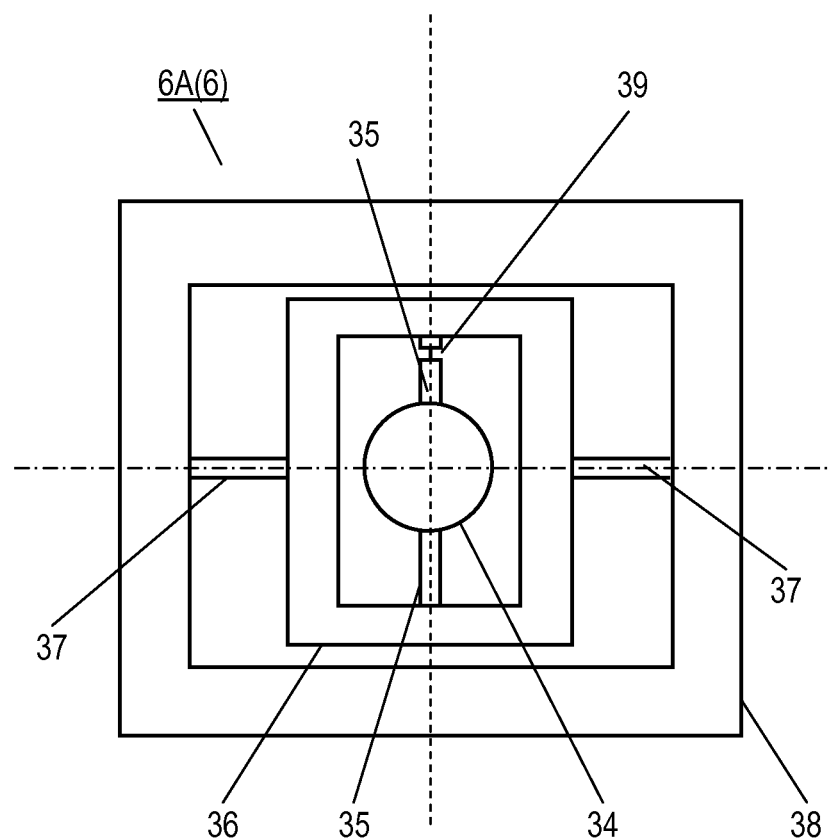
FIG. 10 is a top view of the scanning image display device according to the embodiment having the scanning mirror broken.

FIG. 10 is a top view of scanning mirror 6A in which only one of two higher-speed supporters 35 is broken. As shown in FIG. 10, when only one of two higher-speed supporters 35, that is, a part of two higher-speed supporters 35 is broken at broken part 39, mirror unit 34 may be often held on one side. In this case, a resonance frequency of mirror unit 34 and higher-speed supporters 35 becomes resonance frequency $f1\_H$ that is much lower than resonance frequency $f0\_H$ in the normal operation. Specifically, higher-speed supporters 35 have resonance frequency $f0\_H$ which is the resonance frequency of the oscillation of higher-speed supporters 35 in the normal operation, and resonance frequency $f1\_H$ which is the resonance frequency of the oscillation when a part of higher-speed supporters 35 is broken. Consecutively after executing a process of Step S201 for a predetermined time period, mirror driver 13 drives higher-speed supporters 35 to oscillate with a breaking signal which is a drive signal having a frequency around resonance frequency $f1\_H$ and having the same voltage as in Step S201 in order to break higher-speed supporter 35 that is not broken (Step S202). At Step S202, mirror driver 13 may cause higher-speed supporters 35 to oscillate while sweeping the frequency of the drive signal from a frequency lower than resonance frequency $f1\_H$ to a frequency higher than resonance frequency $f1\_H$. This operation causes higher-speed supporter 35 that has not been broken to be broken exceeding its breaking limit, and can remove mirror unit 34 from higher-speed supporters 35 more reliably.

Next, as shown in FIG. 9, in order to break lower-speed supporters 37, mirror driver 13 causes lower-speed supporters 37 to oscillate and rotate by applying, to lower-speed supporters 37, a breaking signal which is a drive signal at resonance frequency f0_L (Step S203). At Step S203, mirror driver 13 may cause lower-speed supporters 37 to oscillate while sweeping the frequency of the breaking signal from a frequency lower than resonance frequency f0_L to a frequency higher than resonance frequency f0_L. Even when mirror unit 34 is not removed from higher-speed supporters 35 at Steps S201 and S202, the breaking signal at the frequency near resonance frequency f0_L to lower-speed supporters 37 applied at Step S203 causes lower-speed supporters 37 to oscillate at amplitude larger than low-frequency gain G0 shown in FIG. 6 exceeding its breaking limit angle. This operation can remove mirror unit 34 from lower-speed supporters 37 along with movable frame 36 and higher-speed supporters 35. As described above, scanning mirror 6 is configured such that a breaking signal for causing supporters 35 and 37 to oscillate more than their breaking limit angles is input when the value of the monitor signal falls outside the predetermined range of the normal operation and the value of the intensity detected by photodetector 5 does not decrease.

Further, similarly to scanning mirror 6A shown in FIG. 10, when one of two lower-speed supporters 37, that is, a part of two lower-speed supporters 37 is broken and movable frame 36 is held on one side with the other of lower-speed supporters 37, the resonance frequency of movable frame 36 becomes resonance frequency f1_L that is lower than resonance frequency f0_L. Specifically, lower-speed supporters 37 have resonance frequency f0_L which is the resonance frequency of the oscillation of lower-speed supporters 37 in the normal operation, and resonance frequency f1_L which is the resonance frequency of the oscillation when a part of lower-speed supporters 37 is broken. Consequently after executing a process at Step S203 for a predetermined time period, mirror driver 13 drives lower-speed supporters 37 to oscillate with a breaking signal which is a drive signal having a frequency around resonance frequency f1_L and having the same voltage as in Step S203 in order to break lower-speed supporter 37 that is not broken (Step S204). At Step S204, mirror driver 13 may cause lower-speed supporters 37 to oscillate while sweeping the frequency of the drive signal from a frequency lower than resonance frequency f1_L to a frequency higher than resonance frequency f1_L. This operation causes lower-speed supporter 37 that has not been broken to be broken exceeding its breaking limit, and can remove movable frame 36 from lower-speed supporters 37 more reliably.

Higher-speed supporters 35 are provided inside lower-speed supporters 37. That is, higher-speed supporters 35 are connected to outer frame 38 via lower-speed supporters 37 and thus, are not directly connected to outer frame 38. Therefore, a wiring that transmits the drive signal for driving higher-speed supporters 35 is connected via lower-speed supporters 37 to electrode pad 38A provided at outer frame 38. Electrode pad 38A is connected to a drive circuit. The drive signal is supplied to higher-speed supporters 35 from the drive circuit via electrode pad 38A. Therefore, when the breaking signal is applied to one of two lower-speed supporters 37 to become broken before higher-speed supporters 35, the wiring connected to higher-speed supporters 35 may be disconnected. In this case, while mirror unit 34 is connected to outer frame 38 via higher-speed supporters 35, movable frame 36, and lower-speed supporter 37 that is not broken, mirror unit 34 cannot be removed since the breaking signal cannot be supplied to higher-speed supporters 35 to cause to oscillate. In order to reliably remove mirror unit 34, the breaking signal is preferably applied to higher-speed supporters 35 before lower-speed supporters 37 to cause higher-speed supporters 35 to be broken, and then, the breaking signal is applied to lower-speed supporters 37 to cause the lower-speed supporters to be broken.

The image display device described in PTL 1 requires a driving force exceeding a spring force to set a position when the mirror stops driving to be a position which is not irradiated with a laser beam. This increases power consumed by the device accordingly.

The image display device described in PTL 2 is configured such that a scanning mirror itself has a function generating electrical power supplied to a laser light source, and thus stopping of the scanning mirror stops power supply to the laser light source. This is implemented buy a combination of a rotary motor of a polygonal mirror and a power-generating device. In the case that a small MEMS mirror is used, it is difficult to provide the scanning mirror itself with the generating function described above.

The image display device described in PTL 3, when an output of a laser is abnormally increases, an optical system, such as a lens, a mirror, or a screen, changes their properties and causes reflectance to deteriorate, thereby preventing irradiation of the laser. Such an optical system is made of a material that changes its color and reflectance by heat of the laser itself. When the scanning mirror has stopped even though the output of the laser is normal, the intensity of the laser beam on a side of the light source from the scanning mirror does not change. This system cannot be not applied to a projector of a front-projecting type projector that does not include an optical system, such as a projecting lens or a screen, behind the scanning mirror of a rear-projection television set.

As described above, in to the conventional technique, it is difficult to prevent a scanned laser beam from being emitted due to a combination of various failure modes, malfunction of laser control in a worst case.

As described above, in image display device 100 including scanning mirror 6 according to this embodiment, when the level of the monitor signal output from oscillation sensor 206 decreases below the predetermined value and scanning mirror 6 goes out of control even though the drive signal is output from mirror driver 13 to actuator 106 of scanning mirror 6, it is not possible to shut down scanning image display device 100, and the output from photodetector 5 is detected even though the signal for stopping the laser is transmitted, it is determined to be the failure in the laser control system and the mirror driver enters a mirror breaking mode. Then, mirror driver 13 causes the supporters to be oscillate by transmitting the drive signal for driving the supporters and of the maximum voltage of power source 13A to the supporters. The drive signal is generated by power source 13A and has a frequency near the resonance frequency of the supporters. This operation can cause the supporters to oscillate more than their breaking limit angles to become broken, and removes the mirror unit, thereby reliably stopping radiation of the laser.

In scanning mirror 6 having two axes integral with each other, higher-speed supporters are connected to the outer frame via the lower-speed supporters, and not directly connected to the outer frame. Scanning mirror 6 can be removed out more reliably by first outputting the breaking signal to the higher-speed supporters to break the higher-speed supporters, and then, to the lower-speed supporters to break the lower-speed supporters.

Even if only one of the two higher-speed supporters or only one of the two lower-speed supporters is broken and the mirror unit is held on one side, it is possible to remove the mirror unit reliably by applying the breaking signal at resonance frequency f1_H or f1_L in this state.

As described above, even when the function stopping the laser has a trouble, scanning image display device 100 according to this embodiment can prevent an excessive level of laser beam from being irradiated, and prevent excessive energy from being consumed in the normal operation without using any special element of material.

INDUSTRIAL APPLICABILITY

A scanning image display device according the present invention is applicable to laser projectors, head-up displays and the like, with further increased safety.

REFERENCE MARKS IN THE DRAWINGS

1 Light Source
5 Photodetector
6 Scanning Mirror
12 Laser Controller
13 Mirror Driver
14 Image Processor
34, 40 Mirror Unit
35, 41 Higher-Speed Supporter (Supporter, First Higher-Speed Supporter, Second Higher-Speed Supporter)
37, 43 Lower-Speed Supporter (Supporter, First Lower-Speed Supporter, Second Lower-Speed Supporter)
100 Scanning Image Display Device
206 Oscillation Sensor
f0_H Resonance Frequency (First Resonance Frequency)
f0_L Resonance Frequency (Second Resonance Frequency)
f1_H Resonance Frequency (First Resonance Frequency, Third Resonance Frequency)
f1_L Resonance Frequency (Second Resonance Frequency, Fourth Resonance Frequency)

The invention claimed is:

1. A scanning mirror configured to be used with a photodetector and to reflects and scans a laser beam, the scanning mirror comprising:
   a mirror unit configured to reflect the laser beam;
   a supporter configured to cause the mirror unit to rotate and oscillate;
   an actuator which receives a breaking signal for causing the support to oscillate more than a breaking limit angle of the supporter as an input, and which is configured to drive the supporter; and
   an oscillation sensor configured to output a monitor signal indicating oscillation of the mirror unit,
   wherein the photodetector detects an intensity of the laser beam, and
   wherein, the breaking signal is input to the actuator if a value of the monitor signal falls out of a predetermined range of a normal operation and a value of the intensity detected by the photodetector fails to decrease, and the supporter is broken.

2. The scanning mirror according to claim 1,
   wherein the supporter includes:
      a lower-speed supporter configured to rotate the mirror unit; and
      a higher-speed supporter configured to cause the mirror unit to rotate and oscillate at a speed higher than the lower-speed supporter,
   wherein, if the value of the monitor signal falls out of the predetermined range of the normal operation and the value of the intensity detected by the photodetector fails to decrease, a breaking signal for causing the higher-speed supporter to get broken is input to the higher-speed supporter, and then, a breaking signal for causing the lower-speed supporter to get broken is input to the lower-speed supporter.

3. The scanning mirror according to claim 1,
   wherein the supporter includes:
      a lower-speed supporter configured to rotate the mirror unit; and
      a higher-speed supporter configured to cause the mirror unit to rotate and oscillate at a speed higher than the lower-speed supporter,
   wherein the higher-speed supporter has a first resonance frequency and a second resonance frequency, the first resonance frequency being a resonance frequency of oscillation of the higher-speed supporter in a normal operation, the second resonance frequency being a resonance frequency of oscillation when a part of the higher-speed supporter is broken,
   wherein the lower-speed supporter has a third resonance frequency and a fourth resonance frequency, the third resonance frequency being a resonance frequency of oscillation of the lower-speed supporter in the normal operation, the fourth resonance frequency being a resonance frequency of oscillation when a part of the lower-speed supporter is broken,
   wherein, if the value of the monitor signal falls out of the predetermined range of the normal operation and the value of the intensity detected by the photodetector fails to decrease, a first breaking signal based on the first resonance frequency is input to the higher-speed supporter so as to break the higher-speed supporter, and then a second breaking signal based on the second resonance frequency is input to the higher-speed supporter so as to break the higher-speed supporter, and
   wherein, if the value of the monitor signal falls out of the predetermined range of the normal operation and the value of the intensity detected by the photodetector fails to decrease, a third breaking signal based on the third resonance frequency is input to the lower-speed supporter so as to break the lower-speed supporter, and then a fourth breaking signal based on the fourth resonance frequency is input to the lower-speed supporter so as to break the lower-speed supporter.

4. A scanning image display device comprising:
   a light source configured to output a laser beam;
   a scanning mirror configured to scan the laser beam, the scanning mirror including:
      a mirror unit configured to reflect the laser beam,
      a supporter configured to cause the mirror unit to rotate and oscillate, and
      an oscillation sensor configured to output a monitor signal indicating oscillation of the mirror unit;
   a mirror driver configured to drive the scanning mirror and output a synchronization signal;
   an image processor configured to output a video signal synchronously with the synchronization signal;
   a laser controller configured to modulate an intensity of the laser beam based on the video signal; and
   a photodetector configured to detect the intensity of the laser beam,
   wherein, if a value of the monitor signal falls out of a predetermined range of a normal operation and the intensity of the laser beam fails to decrease, the mirror driver is operable to break the scanning mirror.

5. The scanning image display device according to claim 4, wherein, if the value of the monitor signal falls out of the range of the normal operation and the detected intensity of the laser beam fails to decrease, the mirror driver is operable to output a breaking signal for breaking the scanning mirror to the scanning mirror.

6. The scanning image display device according to claim 4, wherein, if the value of the monitor signal falls out of the range of the normal operation and the detected intensity of the laser beam fails to decrease, the mirror driver is operable to sweep a frequency of the breaking signal from a frequency lower than a resonance frequency of the supporter to a frequency higher than the resonance frequency.

7. The scanning image display device according to claim 4, wherein the supporter of the scanning mirror includes:
   a lower-speed supporter configured to rotate the mirror unit; and
   a higher-speed supporter configured to cause the mirror unit to rotate and oscillate at a speed higher than the lower-speed supporter,
   wherein, if the value of the monitor signal falls out of the predetermined range of the normal operation and the value of the intensity detected by the photodetector fails to decrease, the mirror driver is operable to:
      input a breaking signal for causing the higher-speed supporter to get broken to the higher-speed supporter; and
      then, input a breaking signal for causing the lower-speed supporter to get broken to the lower-speed supporter.

8. The scanning image display device according to claim 7, wherein the higher-speed supporter is configured to be driven at a resonance frequency of the higher-speed supporter, and
   wherein the lower-speed supporter is configured to be driven in a non-resonant manner by a drive signal of a voltage higher than a voltage of the higher-speed supporter.

9. The scanning image display device according to claim 8, wherein the breaking signal for breaking the higher-speed supporter is generated at a voltage for rotating the lower-speed supporter.

10. The scanning image display device according to claim 4,
    wherein the supporter of the scanning mirror includes:
       a lower-speed supporter configured to rotate the mirror unit; and
       a higher-speed supporter configured to cause the mirror unit to rotate and oscillate at a speed higher than the lower-speed supporter,
    wherein the higher-speed supporter has a first resonance frequency and a second resonance frequency, the first resonance frequency being a resonance frequency of oscillation of the higher-speed supporter in a normal operation, the second resonance frequency being a resonance frequency of oscillation when a part of the higher-speed supporter is broken,
    wherein, if the value of the monitor signal falls out of the predetermined range of the normal operation and the value of the intensity detected by the photodetector fails to decrease, the mirror driver is operable to:
       input a first breaking signal based on the first resonance frequency to the higher-speed supporter so as to break the higher-speed supporter; and
       then, input a second breaking signal based on the second resonance frequency to the higher-speed supporter so as to break the higher-speed supporter.

11. The scanning image display device according to claim 10,
    wherein the lower-speed supporter has a third resonance frequency and a fourth resonance frequency, the third resonance frequency being a resonance frequency of oscillation of the lower-speed supporter in the normal operation, the fourth resonance frequency being a resonance frequency of oscillation of the lower-speed supporter when a part of the lower-speed supporter is broken, and
    wherein, if the value of the monitor signal falls out of the predetermined range of the normal operation and the value of the intensity detected by the photodetector fails to decrease, the mirror driver is operable to:
       input a third breaking signal based on the third resonance frequency to the lower-speed supporter so as to break the lower-speed supporter; and
       then, input a fourth breaking signal based on the fourth resonance frequency to the lower-speed supporter in order to break the lower-speed supporter.

12. The scanning image display device according to claim 11,
    wherein, if the value of the monitor signal falls out of the predetermined range of the normal operation and the value of the intensity detected by the photodetector fails to decrease, the mirror driver is operable to:
       input the first breaking signal to the higher-speed supporter so as to break the higher-speed supporter;
       then, input the second breaking signal to the higher-speed supporter so as to break the higher-speed supporter;
       then, input the third breaking signal to the lower-speed supporter so as to break the lower-speed supporter; and
       then, input the fourth breaking signal to the lower-speed supporter so as to break the lower-speed supporter.

13. The scanning image display device according to claim 4,
    wherein the supporter of the scanning mirror includes:
       a lower-speed supporter configured to rotate the mirror unit; and
       a higher-speed supporter configured to cause the mirror unit to rotate and oscillate at a speed higher than the lower-speed supporter,
    wherein the lower-speed supporter has a first resonance frequency and a second resonance frequency, the first resonance frequency being a resonance frequency of oscillation of the lower-speed supporter in a normal operation, the second resonance frequency being a resonance frequency of oscillation of the lower speed supporter when a part of the lower-speed supporter is broken,
    wherein, if the value of the monitor signal falls out of the predetermined range of the normal operation and the value of the intensity detected by the photodetector fails to decrease, the mirror driver is operable to:
       input a first breaking signal based on the first resonance frequency to the lower-speed supporter so as to break the lower-speed supporter; and
       then, input a second breaking signal based on the second resonance frequency so as to break the lower-speed supporter.

14. The scanning image display device according to claim 5, wherein, if the value of the monitor signal falls out of the range of the normal operation and the detected intensity of the laser beam fails to decrease, the mirror driver is operable to sweep a frequency of the breaking signal from a frequency lower than a resonance frequency of the supporter to a frequency higher than the resonance frequency.

* * * * *